(12) United States Patent
Darling

(10) Patent No.: US 10,391,702 B2
(45) Date of Patent: Aug. 27, 2019

(54) PERSONAL WATERCRAFT FABRICATION USING THERMOFORMING

(71) Applicant: Free Form Factory, Inc., Phoenix, AZ (US)

(72) Inventor: Jordan Darling, Ontario, NY (US)

(73) Assignee: Free Form Factory, Inc., Phoenix, AZ (US)

(*) Notice: Subject to any disclaimer, the term of this patent is extended or adjusted under 35 U.S.C. 154(b) by 479 days.

(21) Appl. No.: 14/949,881

(22) Filed: Nov. 24, 2015

(65) Prior Publication Data

US 2017/0144359 A1    May 25, 2017

(51) Int. Cl.
| | | |
|---|---|---|
| *B29C 51/10* | (2006.01) | |
| *B29C 51/42* | (2006.01) | |
| *B29C 51/26* | (2006.01) | |
| *B63B 9/06* | (2006.01) | |
| *B29K 105/00* | (2006.01) | |
| *B29L 31/30* | (2006.01) | |
| *B63B 5/24* | (2006.01) | |
| *B63B 35/73* | (2006.01) | |

(52) U.S. Cl.
CPC ............ *B29C 51/10* (2013.01); *B29C 51/266* (2013.01); *B29C 51/421* (2013.01); *B63B 5/24* (2013.01); *B63B 9/06* (2013.01); *B29K 2105/256* (2013.01); *B29L 2031/307* (2013.01); *B29L 2031/3067* (2013.01); *B63B 35/731* (2013.01)

(58) Field of Classification Search
CPC ............................... B29C 51/10; B29C 51/266
USPC .......................................................... 264/138
See application file for complete search history.

(56) References Cited

U.S. PATENT DOCUMENTS

| | | | |
|---|---|---|---|
| 2,357,806 A | 9/1944 | Borkland | |
| 2,617,126 A | 11/1952 | Nebesar | |
| 3,153,796 A | 10/1964 | Bernhardt | |
| 3,552,349 A * | 1/1971 | Snow | B63B 35/731 |
| | | | 114/288 |
| 3,655,320 A | 4/1972 | Heavener | |
| 4,021,874 A | 5/1977 | Alter | |
| 4,362,519 A | 12/1982 | Gault | |

(Continued)

FOREIGN PATENT DOCUMENTS

| | | |
|---|---|---|
| WO | WO/1987/002638 A1 | 5/1987 |
| WO | WO/1989/011995 A1 | 12/1989 |

(Continued)

OTHER PUBLICATIONS

Belland Technolgy AG, Belland® Polymers for Extrusion, Thermoforming and Injection Molding, Published Jan. 2014, http://www.belland.de/uploads/file/pdf-daten/201401%20bellandtechnology%20ag_extrusion%20en.pdf.*

(Continued)

*Primary Examiner* — Robert C Dye
*Assistant Examiner* — Russell E Sparks
(74) *Attorney, Agent, or Firm* — Snell & Wilmer L.L.P.

(57) ABSTRACT

Personal watercraft and personal watercraft fabrication using a thermoforming process are described. The personal watercraft manufacturing process includes a set of molds, thermoforming equipment, and thermal formable materials. The process greatly reduces manufacturing costs, decreases manufacturing time, increases part consistency and tolerances, offers better performance characteristics and durability and results in less environmentally harmful deposits and waste.

8 Claims, 9 Drawing Sheets

(56) References Cited

U.S. PATENT DOCUMENTS

| | | | |
|---|---|---|---|
| 4,975,236 A | 12/1990 | Maclachlan | |
| 5,005,510 A | 4/1991 | Schad | |
| 5,036,789 A | 8/1991 | Kelly | |
| 5,094,607 A | 3/1992 | Masters | |
| 5,271,352 A | 12/1993 | Wilson | |
| 5,390,621 A * | 2/1995 | Hattori | B63B 1/20 114/211 |
| 5,433,165 A | 7/1995 | McGuiness | |
| 5,517,939 A | 5/1996 | Harman | |
| 5,588,392 A | 12/1996 | Bailey | |
| 5,853,650 A | 12/1998 | Lonno | |
| 5,951,939 A | 9/1999 | Chernyak | |
| 6,021,732 A * | 2/2000 | Hobbs | B63B 5/24 114/357 |
| 6,325,014 B1 | 12/2001 | Blanchard | |
| 6,367,361 B1 | 4/2002 | Christensen | |
| 6,394,020 B1 | 5/2002 | Vallentuna | |
| 6,412,434 B1 | 7/2002 | Kaneko | |
| 6,675,730 B2 * | 1/2004 | Simard | B63H 11/113 114/55.52 |
| 6,843,192 B1 | 1/2005 | Nugteren | |
| 7,156,043 B2 | 1/2007 | Sahr | |
| 8,701,585 B1 | 4/2014 | Seaman | |
| 2002/0109251 A1 | 8/2002 | Sellepack | |
| 2003/0197302 A1 | 10/2003 | Kakarala | |
| 2005/0161861 A1 | 7/2005 | Lammers | |

FOREIGN PATENT DOCUMENTS

| | | | |
|---|---|---|---|
| WO | WO/2000/040392 A1 | 7/2000 |
| WO | WO/2001/070488 A1 | 9/2001 |
| WO | WO2017091416 A1 | 6/2017 |

OTHER PUBLICATIONS

Paul Bruno, What is a Vessel's Chine?, ThoughtCo., Published Aug. 18, 2017, https://www.thoughtco.com/what-is-a-vessels-chine-2292984.*

Family Molding, Mold Hot Runner Solutions, https://web.archive.org/web/20150915054542/http://www.mhs-hotrunners.com/familymolding.html, published Sep. 15, 2015.*

PCT International Search Report and Written Opinion, International Application No. PCT/US2016/062351, dated Jan. 19, 2017.

PCT International Preliminary Report on Patentability, International Application No. PCT/US2016/062351, dated May 29, 2018.

* cited by examiner

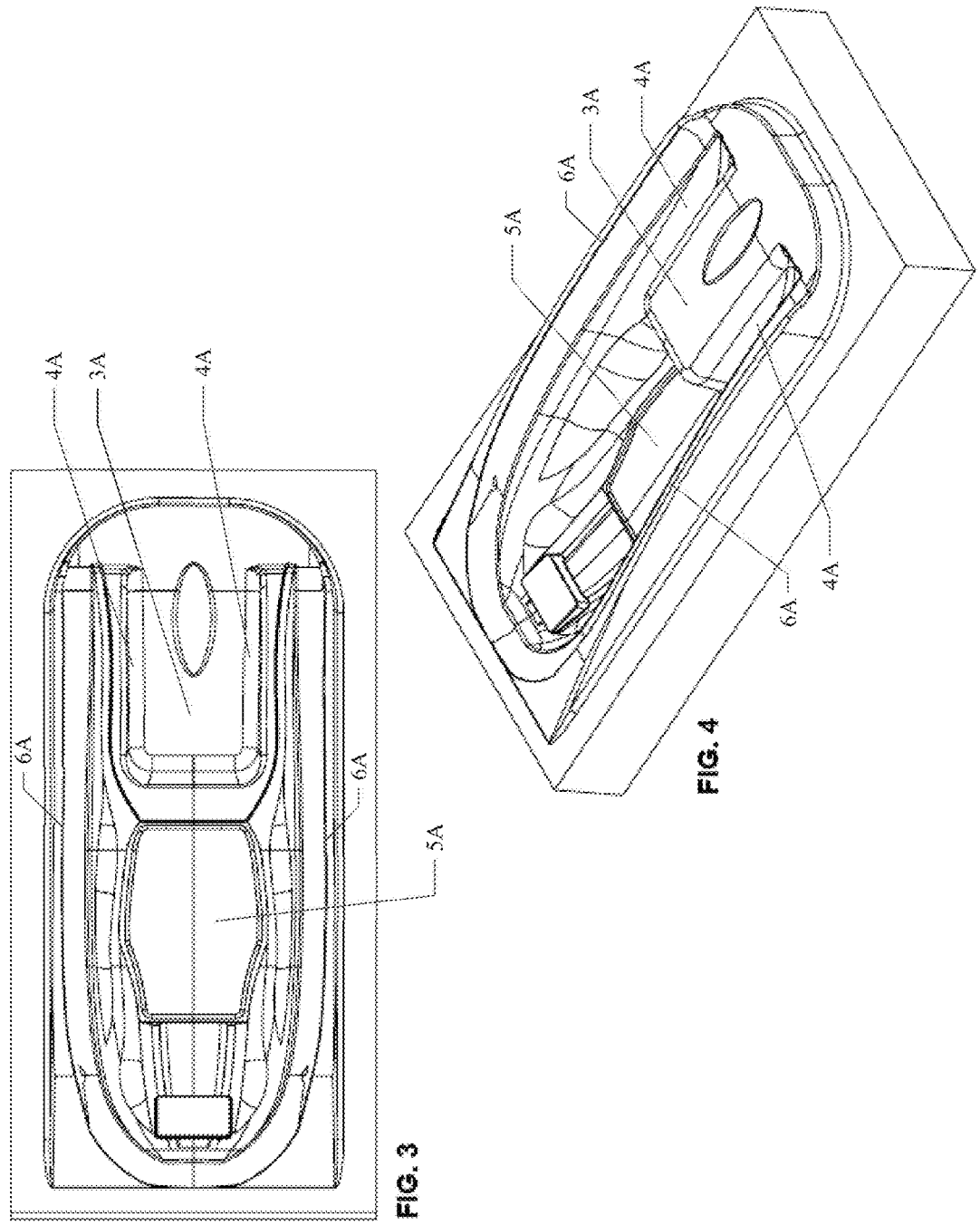

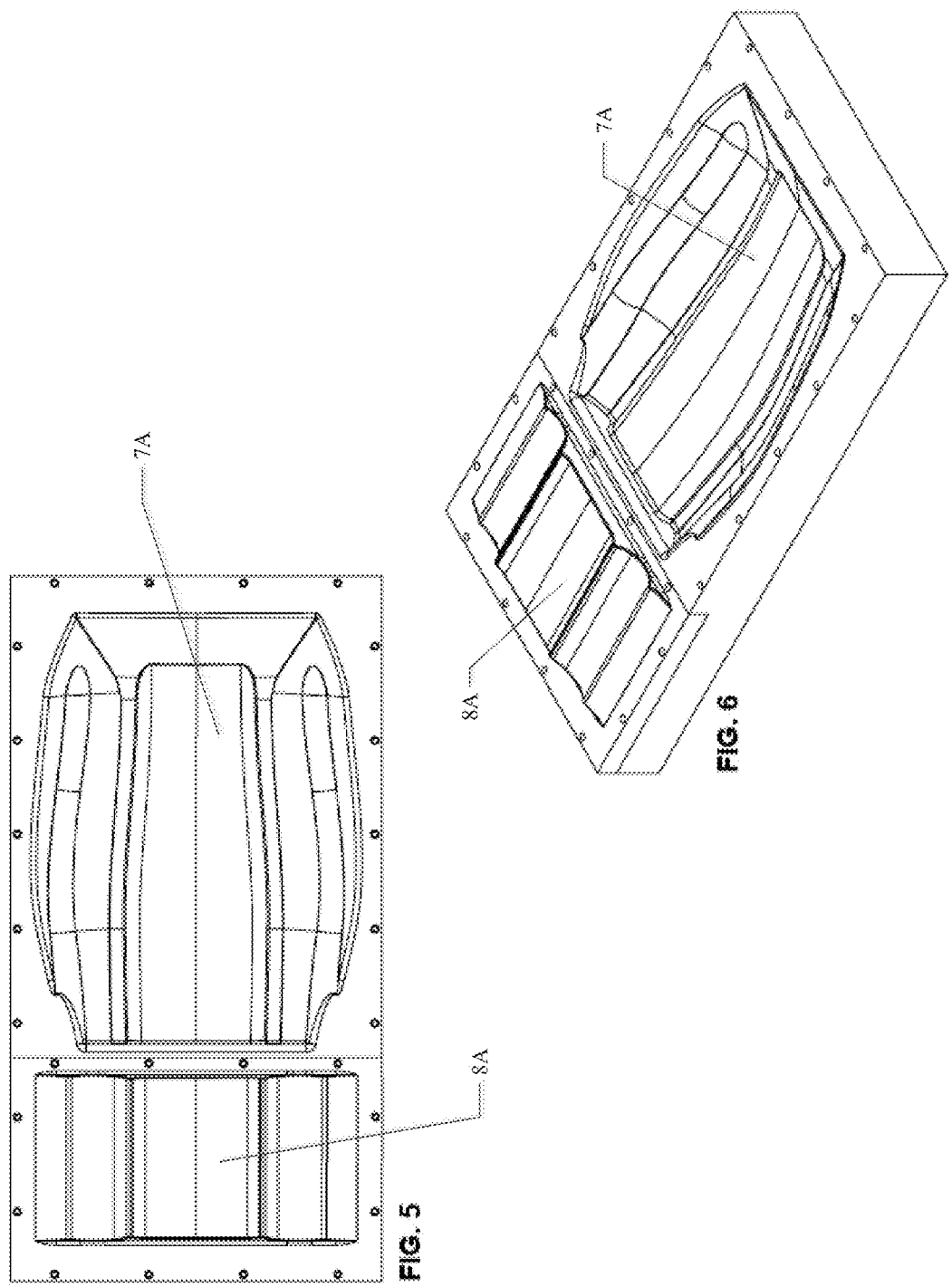

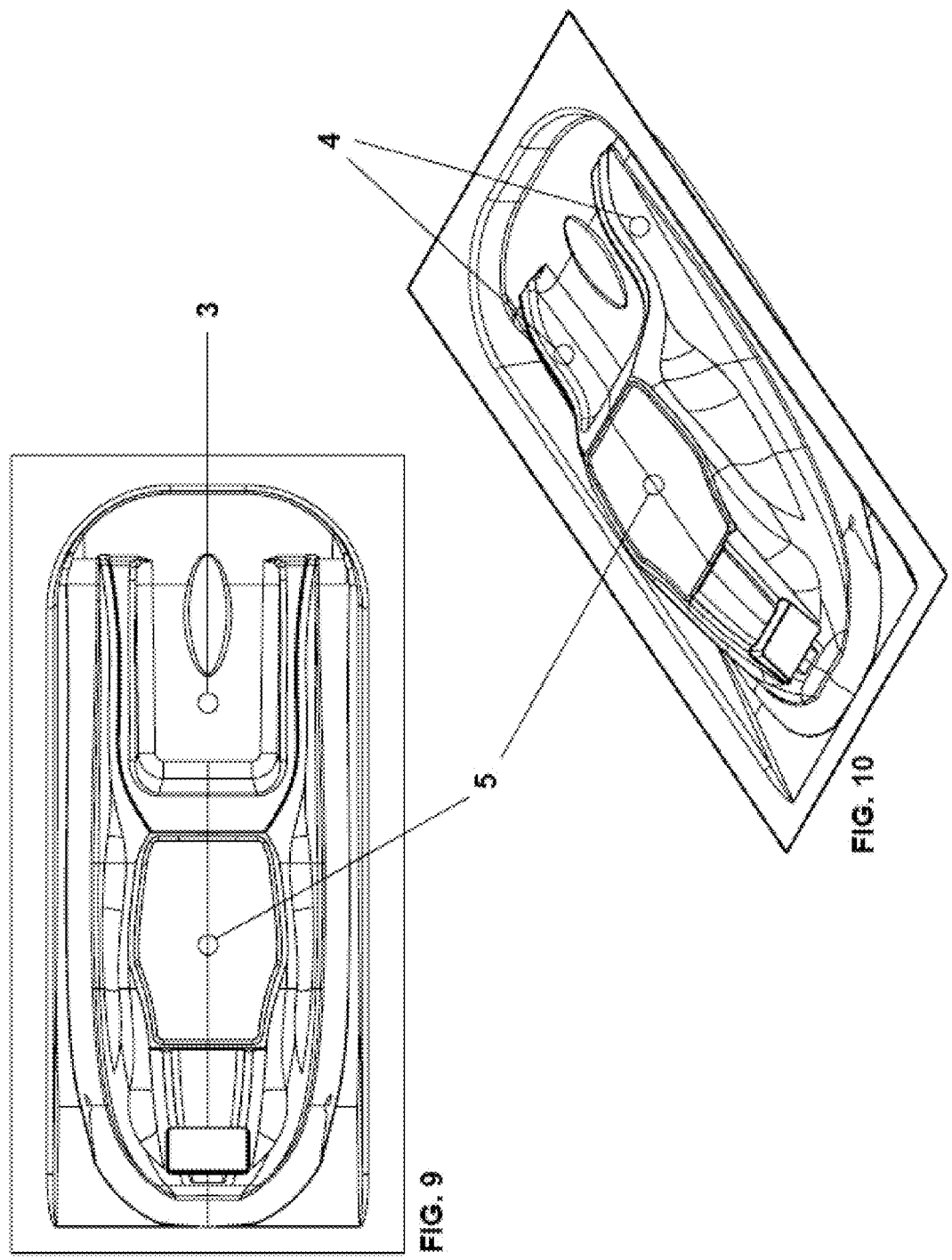

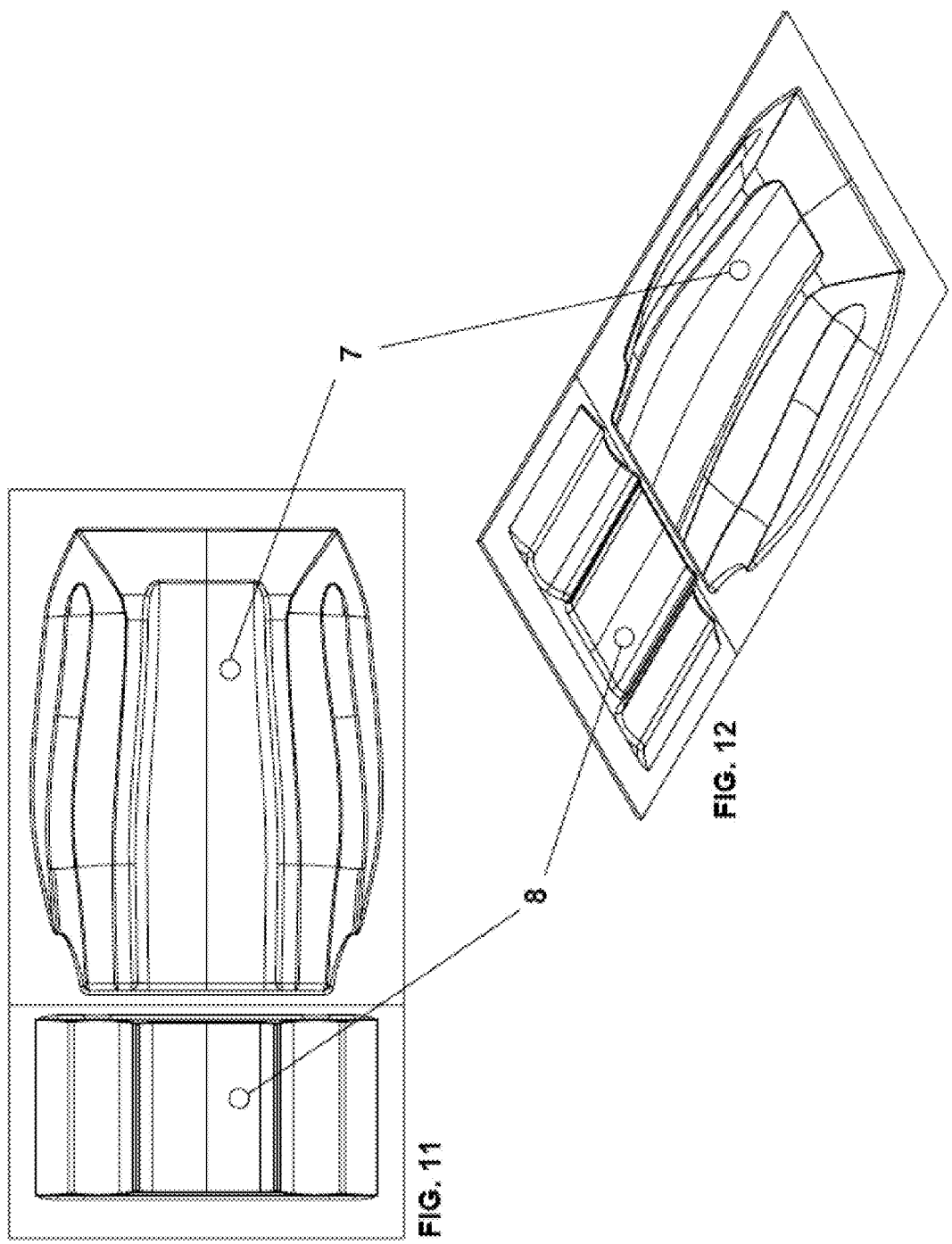

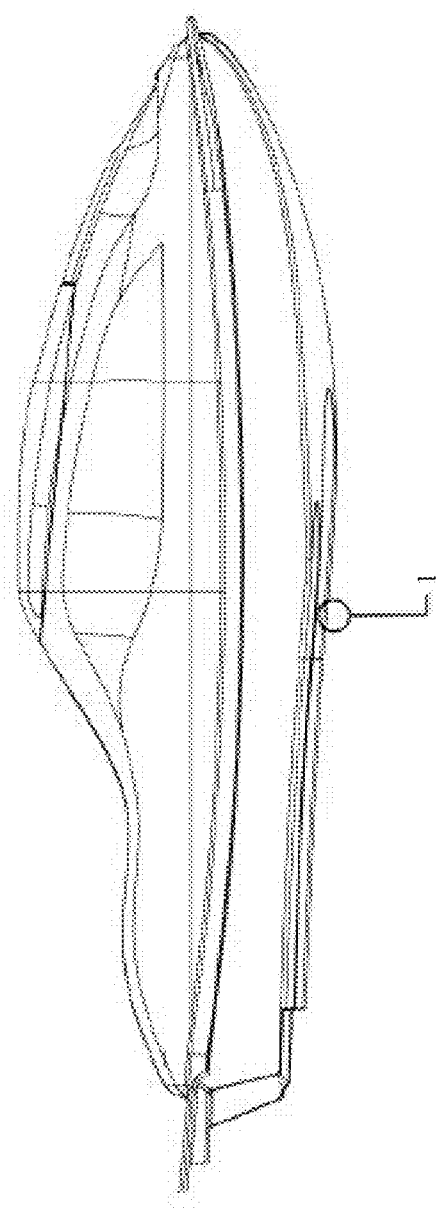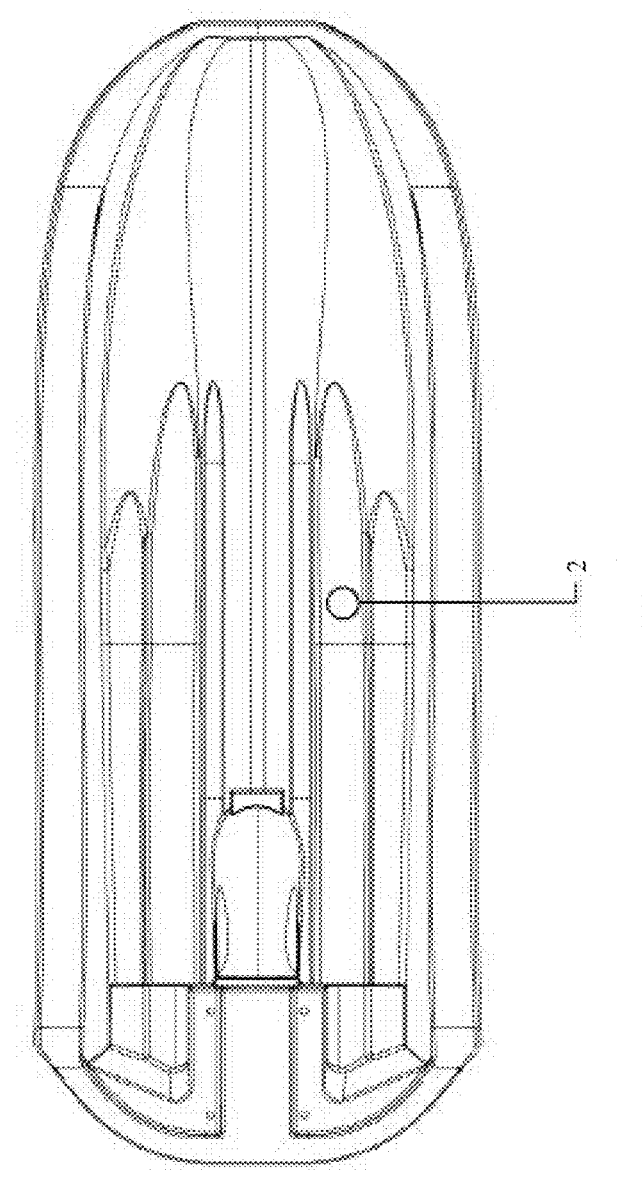

```
┌─────────────────────────────────────────────────────────┐
│  A Method for Fabricating Personal Watercraft Using Thermoforming │
│                         -900-                           │
└─────────────────────────────────────────────────────────┘
                              │
                              ▼
┌─────────────────────────────────────────────────────────┐
│  Produce a mold for a component of a personal watercraft, the mold including │
│           features for assimilation into the component. │
│                         -902-                           │
└─────────────────────────────────────────────────────────┘
                              │
                              ▼
┌─────────────────────────────────────────────────────────┐
│             Insert thermoplastic material into a heater.│
│                         -904-                           │
└─────────────────────────────────────────────────────────┘
                              │
                              ▼
┌─────────────────────────────────────────────────────────┐
│        Drape the heated thermoplastic material over the mold. │
│                         -906-                           │
└─────────────────────────────────────────────────────────┘
                              │
                              ▼
┌─────────────────────────────────────────────────────────┐
│  Draw the heated thermoplastic material into or over the mold using a │
│  vacuum, the heated thermoplastic material assimilating the features of the │
│             mold to produce the component.              │
│                         -908-                           │
└─────────────────────────────────────────────────────────┘
                              │
                              ▼
┌─────────────────────────────────────────────────────────┐
│                  Allow the component to cool.           │
│                         -910-                           │
└─────────────────────────────────────────────────────────┘
                              │
                              ▼
┌─────────────────────────────────────────────────────────┐
│              Extract the component from the mold.       │
│                         -912-                           │
└─────────────────────────────────────────────────────────┘
                              │
                              ▼
┌─────────────────────────────────────────────────────────┐
│            Trim excess material from the component.     │
│                         -914-                           │
└─────────────────────────────────────────────────────────┘
                              │
                              ▼
                           ( End )
```

Fig. 17

PERSONAL WATERCRAFT FABRICATION USING THERMOFORMING

BACKGROUND

Technical Field

The present disclosure generally relates to watercraft, watercraft fabrication, and generally to the use of a thermoforming process to fabricate components. More specifically, the present disclosure relates to personal watercraft fabrication using thermoforming.

COPYRIGHT

A portion of the disclosure of this patent document contains material that is subject to copyright protection. The copyright owner has no objection to the facsimile reproduction of the patent document or the patent disclosure, as it appears in the Patent and Trademark Office patent files or records, but otherwise reserves all copyright rights whatsoever. The following notice applies to the disclosure and data as described below and in the drawings that form a part of this document: Copyright 2014-2015 FREE FORM FACTORY INC.™, All Rights Reserved. FREE FORM FACTORY INC. is a designer and manufacturer of personal watercraft.

RELATED ART

Watercraft, including jetskis, are a common mode of transportation on the water. However, conventional watercraft have physical and structural boundaries that are being pushed by enthusiasts every day. In many cases, the advancement of watercraft engines is outpacing the design and manufacturing of the hulls. The hulls on conventional watercraft are still manufactured using costly, time-consuming, and environmentally detrimental processes. There is a need for a stronger, easier to manufacture, and environmentally-conscious manufacturing process for personal watercraft hull, deck, and covering components to accommodate this rapidly advancing industry.

Personal watercraft are currently manufactured using the process of fiberglass lay-up. This process is used to fabricate standard sport boat types of watercraft hulls in a closed mold resin transfer molding (RTM) process or a vacuum molding process. In a RTM process, a two-piece mold consists of a female dye (cavity) and a male dye (core) used in the process. A composite mixture of resin, reinforcement, filler, and additives is placed between the two matched molds, which are then closed under pressure to cure the composite into a solid reinforced plastic part. The fiberglass manufacturing process is labor-intensive, time-consuming, and releases volatile organic compounds (VOC) that may be toxic to those manufacturing it. Additionally, the fiberglass fabrication process imposes limitations on the performance, durability, and consistency in the manufacturing of watercraft parts.

For example, U.S. Pat. No. 2,617,126 to Nebesar demonstrates the use of impregnated fiberglass to create a solid one-piece hull. In FIG. 1 of Nebesar, a laborer is depicted in the beginning of the lay-up process wearing a respirator. This is indicative of the hazardous airborne chemicals that are emitted during this manufacturing method. Also indicated are multiple steps and complex jigs required to execute this hull manufacturing method. This similar method, and its downfalls, are demonstrated in U.S. Pat. No. 5,433,165 to McGuiness. These similar processes and their flaws are typical when the manufacturing process uses hand labor that requires multiple layers of fiberglass material and resins joined together. The conventional process of constructing each boat hull and deck is time-consuming and labor-intensive, thereby adding to the overall cost of construction. Additionally, there are environmental issues with the construction of fiberglass boats in the creation of volatile organic compounds.

U.S. Pat. No. 8,701,585 to Seaman describes watercraft, such as a boat, that is molded in two sections, such as the boat deck and the boat hull, using a polyuria composition and polyurethane foam and chopped glass fibers. The result is a monolithic structure that can allegedly be manufactured quickly in a closed molding process that does not create volatile organic compounds. However, the described manufacturing process is very expensive and requires skilled labor. There are variables in each lay-up, such as the expansion rate of the foam compound, which must be determined and that add to the complexity of this process. In addition, the compound typically requires an embedded metal frame and a UV-protection coating in order to make it last in the typical use conditions. All of this conventional process is complex, inconsistent, requires skilled labor, and yields a product that will eventually fail structurally over time and produce un-recyclable waste.

SUMMARY

In various example embodiments shown and described herein, a method of manufacturing objects, such as personal watercraft hulls, decks, hoods, and covering components by thermoforming sheets of thermoplastic material is disclosed. In an example embodiment, sheets of thermoplastic material are heated and a thermoforming step is performed in which the heated sheets are manipulated plastically inside or outside of a mold using heat and vacuum and/or air pressure. In various example embodiments, the disclosed process is directed to an application of forming polymers and other especially thermo-reactive plastics using rapid changes in temperature that correlate to the properties of the given material. As described in more detail herein, the material is formed to a molded surface and cured/cooled down. In an example embodiment, the process is used in the fabrication of personal watercraft, including, but not limited to, personal watercraft hulls, decks, hoods, and covering components. The various embodiments described herein include a variety of products and methods for a variety of watercraft, including both sit down watercraft, stand up watercraft, jetskis, and the like.

Manufacturing personal watercraft hulls, decks, hoods, and covering components comprises the use of molds, male or female, to which the thermoset plastic or other thermoplastic material will form, thereby creating the desired components. The formed sheets of thermoplastic material can then be trimmed to the specified part for final assembly. This process greatly reduces manufacturing costs, decreases manufacturing time, increases part consistency, offers better performance characteristics and durability, and results in less environmentally harmful deposits and waste.

An objective of the various example embodiments is to provide a means of manufacturing personal watercraft hulls, decks, hoods, and covering components so that they are more durable and rigid, easier to manufacture, quicker to manufacture, and result in less environmentally harmful waste. In various example embodiments, a thermoforming manufacturing process is used to fabricate personal watercraft hulls, decks, hoods, and covering components.

In an example embodiment, a personal watercraft hull, deck, hood, and covering components will resist higher impacts, because of the method of thermoform manufacturing as disclosed herein.

In an example embodiment, a personal watercraft hull, deck, hood, and covering components will have decreased manufacturing times, because of the method of thermoform manufacturing as disclosed herein.

In an example embodiment, a personal watercraft hull, deck, hood, and covering components will have increased consistency per part, because of the method of thermoform manufacturing as disclosed herein.

In an example embodiment, a personal watercraft hull, deck, hood, and covering components will be environmentally friendly and recyclable, because of the method of thermoform manufacturing as disclosed herein.

Other features and advantages of the example embodiments will become apparent from the following detailed description taken in conjunction with the accompanying drawings which illustrate, by way of example, the principles of the example embodiments.

BRIEF DESCRIPTION OF THE DRAWINGS

For a better understanding of the example embodiments, reference should be made to the following detailed description disclosed in conjunction with the accompanying drawings, in which:

FIG. 3 is a top view of a personal watercraft thermoforming top deck mold;

FIG. 4 is a perspective view of a personal watercraft thermoforming top deck mold;

FIG. 5 is a top view of a personal watercraft thermoforming hood and covering component family mold;

FIG. 6 is a perspective view of a personal watercraft thermoforming hood and covering component family mold;

FIG. 9 is a top view of the result of thermoform manufacturing a top deck according to an example embodiment;

FIG. 10 is a perspective view of the result of thermoform manufacturing a top deck according to an example embodiment;

FIG. 11 is a top view of the result of thermoform manufacturing a hood and covering components according to an example embodiment;

FIG. 12 is a perspective view of the result of thermoform manufacturing a hood and covering components according to an example embodiment;

FIG. 15 is a side view of the assembled hull, top deck, and hood manufactured by the method of thermoform manufacturing according to an example embodiment;

FIG. 16 is a bottom view of the assembled hull, top deck, and hood manufactured by the method of thermoform manufacturing according to an example embodiment; and FIG. 17 is a flowchart illustrating one method of personal watercraft hull, deck, hood, and covering component manufacturing by the method of thermoform manufacturing according to an example embodiment.

DETAILED DESCRIPTION

Reference will now be made in detail to the example embodiments illustrated in the accompanying drawings. Wherever possible, the same reference numbers will be used throughout the drawings to refer to the same or like parts. Personal watercraft and personal watercraft fabrication using a thermoforming process are described herein.

Figure 1:
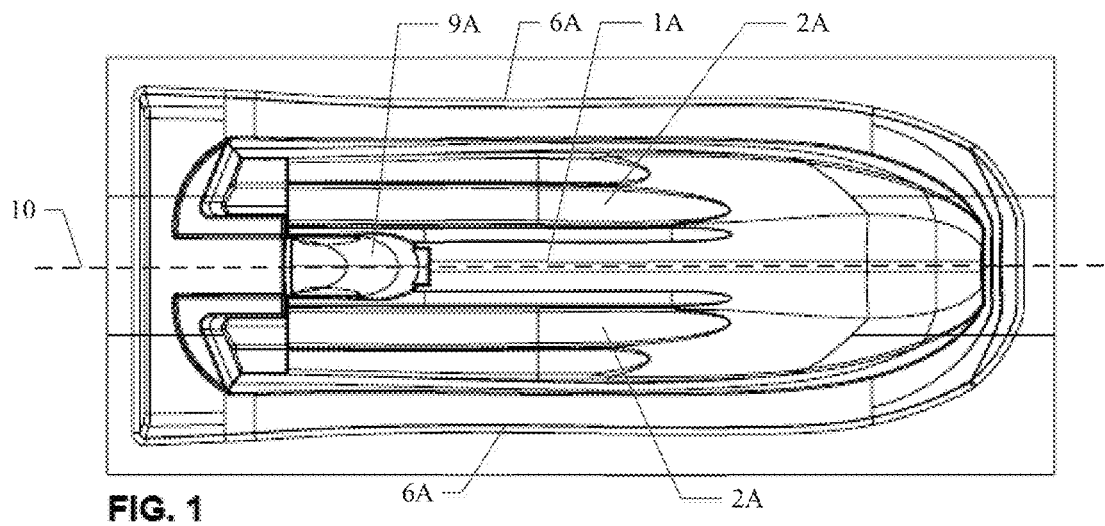
FIG. 1 is a top view of a personal watercraft thermoforming bottom hull mold.
Figure 2:
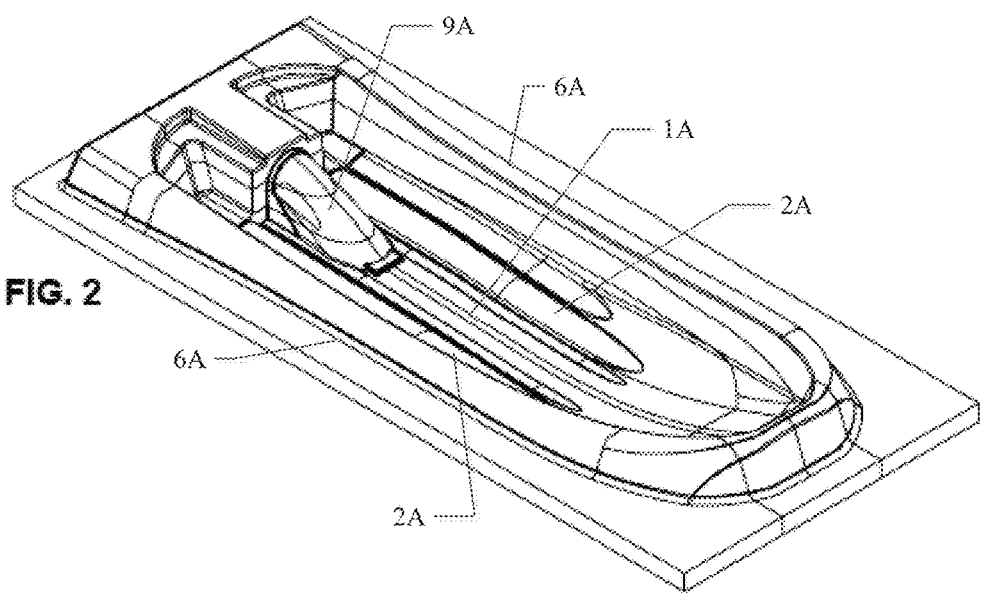
FIG. 2 is a perspective view of a personal watercraft thermoforming bottom hull mold.

FIG. 1 is a top view of a personal watercraft thermoforming bottom hull mold. FIG. 2 is a perspective view of a personal watercraft thermoforming bottom hull mold. As shown in FIGS. 1 and 2, a mold can be used to fabricate a watercraft bottom deck/hull (e.g., the bottom section of the watercraft) using a thermoforming process. In an example embodiment, the illustrated mold includes a first feature 1A used to form a mid-rocker 1 in the fabricated bottom hull (e.g., see FIGS. 7, 8, and 15). The mid-rocker 1 is produced by a low, generally flat recessed feature 1A in the mold running longitudinally at the centerline 10 from the bow to a pump intake feature aft of the point amidships. On the exterior side of the fabricated bottom hull, the mid-rocker 1 is a generally flat raised area in the hull running longitudinally at the centerline 10 and parallel with the centerline 10. The mid-rocker 1 provides lift in the center of the bottom deck/hull by slowing down the flow of water, thereby giving the hull a unique aquatic handling characteristic.

Figure 7:
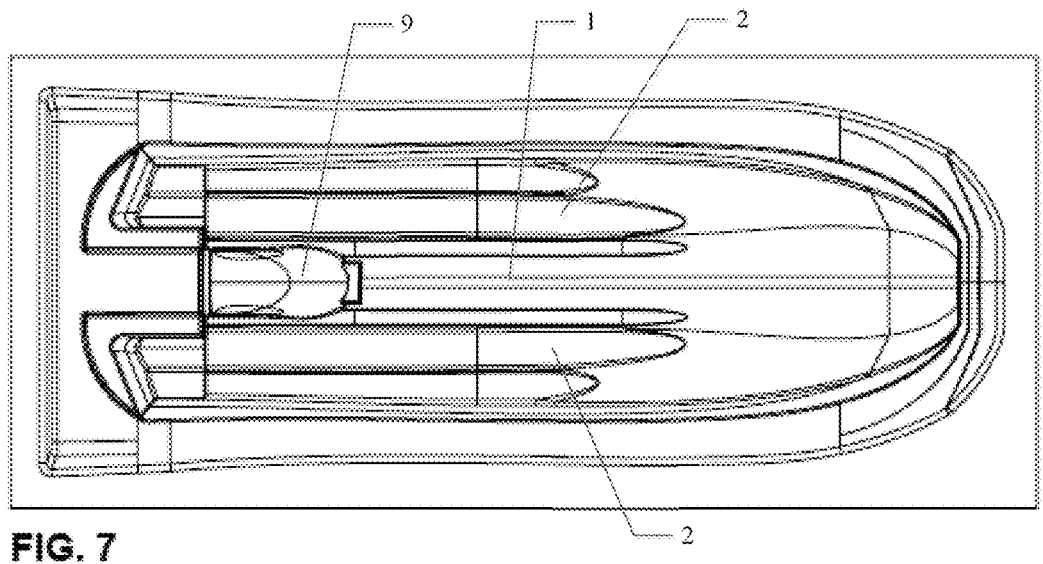
FIG. 7 is a top view of the result of thermoform manufacturing a bottom hull according to an example embodiment.
Figure 8:
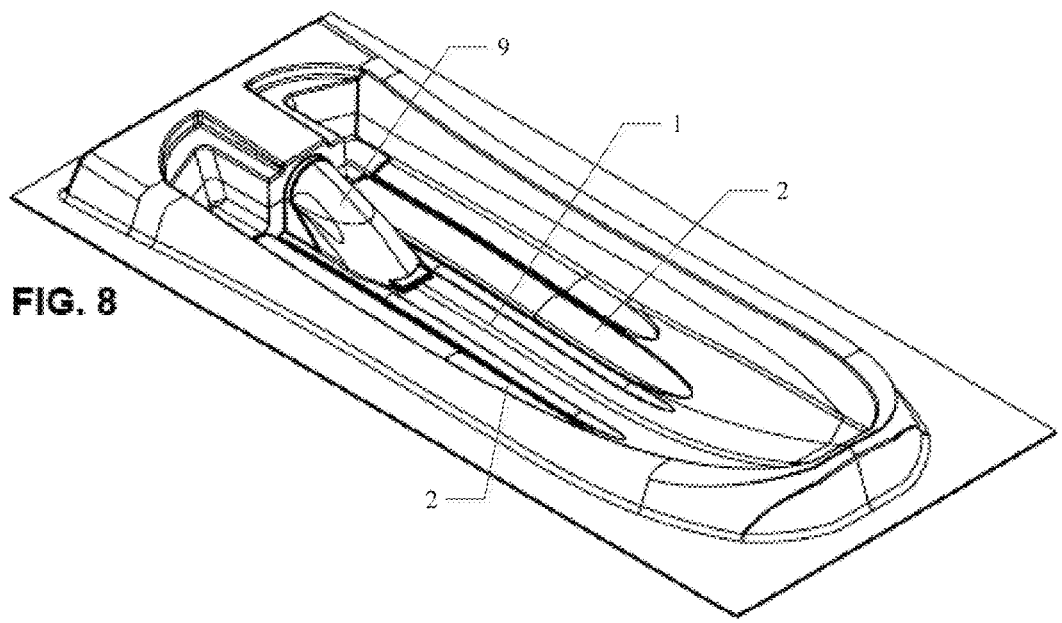
FIG. 8 is a perspective view of the result of thermoform manufacturing a bottom hull according to an example embodiment.

Referring still to FIGS. 1 and 2 in the example embodiment, the illustrated bottom hull mold includes second features 2A used to form chines 2 in the fabricated bottom hull (e.g., see FIGS. 7, 8, and 15). The chines 2 are produced by convex, raised features 2A in the mold running longitudinally both port and starboard of the centerline 10 and parallel with the centerline 10. On the exterior side of the fabricated bottom hull, the chines 2 are concave grooves in the hull running longitudinally on either side of the centerline 10 and parallel with the centerline 10. The chines 2 provide a means of carving and turning and improve the aquatic handling of the watercraft. On the interior side of the fabricated bottom hull, the valley of the chines 2 are designed to accommodate an internal structure that provides rigidity and eliminates unwanted flex of the hull.

Referring still to FIGS. 1 and 2 in the example embodiment, the illustrated bottom hull mold includes a third feature 9A used to form a pump cavity/pump tunnel 9 in the fabricated bottom hull (e.g., see FIGS. 7 and 8). The pump cavity/pump tunnel 9 is produced by a convex, rounded feature 9A in the aft portion of the mold to produce a cavity or tunnel 9 in the fabricated bottom hull. The pump cavity/pump tunnel 9 is provided in the fabricated bottom hull to accommodate the intake of water into a jet pump.

Given the bottom hull mold as illustrated in FIGS. 1 and 2 and described above, the fabricated bottom hull can be produced with this mold using a thermoforming process instead of a conventional fiberglass/resin process. In an example embodiment, one or more sheets of thermoplastic material can be heated in conventional ways, such as by insertion into a heating unit or heater. The thermoplastic material can be any of a variety of standard polymers, thermo-reactive plastics, and other thermoplastic materials. The heated thermoplastic sheets can be manipulated plastically in or outside of the mold using heat and vacuum and/or air pressure. Desired temperature levels and corresponding pliability levels can be achieved. Especially thermo-reactive plastics can accommodate rapid changes in temperature that correlate to the properties of the given material. After the thermoplastic sheet is heated to a desired temperature, the heated thermoplastic sheet can be draped over the mold, such as the bottom hull mold described above. Positive or negative air pressure or a vacuum can be used to draw the heated thermoplastic sheet into the mold and into contact with the various features of the mold as described above. By virtue of the geometry and configuration of the mold features and the pliability of the thermoplastic sheet controlled by the temperature and properties of the material, the heated thermoplastic sheet is drawn into the mold in a manner that minimizes or eliminates air pockets between the heated thermoplastic sheet and the outer surface of the mold. Once the heated thermoplastic sheet has completely enveloped the mold and assimilated the features of the mold, the thermoplastic sheet can be allowed to cool. After the thermoplastic sheet has cooled, the material hardens in the shape of the features on the mold and becomes a fabricated part. In the case of the use of the bottom hull mold as described above, the fabricated part becomes the fabricated bottom hull. At this point, the fabricated part can be extracted from the mold. Any excess material can be trimmed from the fabricated part. The fabricated part is now ready to be coupled with other fabricated parts to produce the final assembly. As a result, a variety of parts can be fabricated using the thermoforming process described herein.

FIG. 3 is a top view of a personal watercraft thermoforming top deck mold. FIG. 4 is a perspective view of a personal watercraft thermoforming top deck mold. As shown in FIGS. 3 and 4, a mold can be used to fabricate a watercraft top deck using the thermoforming process described above. In an example embodiment, the illustrated mold includes a first feature 3A used to form a foot tray/trays 3 in the fabricated top deck (e.g., see FIGS. 9 and 10). The foot tray/trays 3 are produced by a raised, generally flat feature 3A in the mold at the aft end of the watercraft mold. On the exterior side of the fabricated top deck, the foot tray/trays 3 are a generally flat lowered area in the top deck at the aft end of a stand up watercraft and on either side of a sit down watercraft. The foot tray/trays 3 provide a place for the rider or riders to stand/place their feet in the finished watercraft assembly. In an example embodiment, a vertical wall, also known as a bulkhead/firewall, can be fabricated under the front edge of the foot tray/trays 3, in between the top deck and bottom hull components. This bulkhead/firewall can also be thermoformed, thereby providing a tight tolerance and a repeatable precision part. The bulkhead/firewall provides a means of mounting drivetrain couples and plumbing inside the fabricated watercraft.

Referring still to FIGS. 3 and 4 in the example embodiment, the illustrated top deck mold includes second features 4A used to form gunwales 4 in the fabricated top deck (e.g., see FIGS. 9 and 10). The gunwales 4 are produced by generally rectangular, lowered features 4A at the aft end of the watercraft mold. On the exterior side of the fabricated top deck, the gunwales 4 are generally rectangular, raised short walls. The gunwales 4 are provided to prevent the rider/rider's feet from sliding off the side of the foot tray/trays 3.

Referring still to FIGS. 3 and 4 in the example embodiment, the illustrated top deck mold includes a third feature 5A used to form an engine bay opening 5 in the fabricated top deck (e.g., see FIGS. 9 and 10). The engine bay opening 5 is produced by generally rectangular, lowered feature 5A at the center of the watercraft mold. On the exterior side of the fabricated top deck, the engine bay opening 5 is a generally rectangular, raised area in the top deck. The engine bay opening 5 is produced to provide an entry point into the engine bay of the watercraft.

Figure 13:
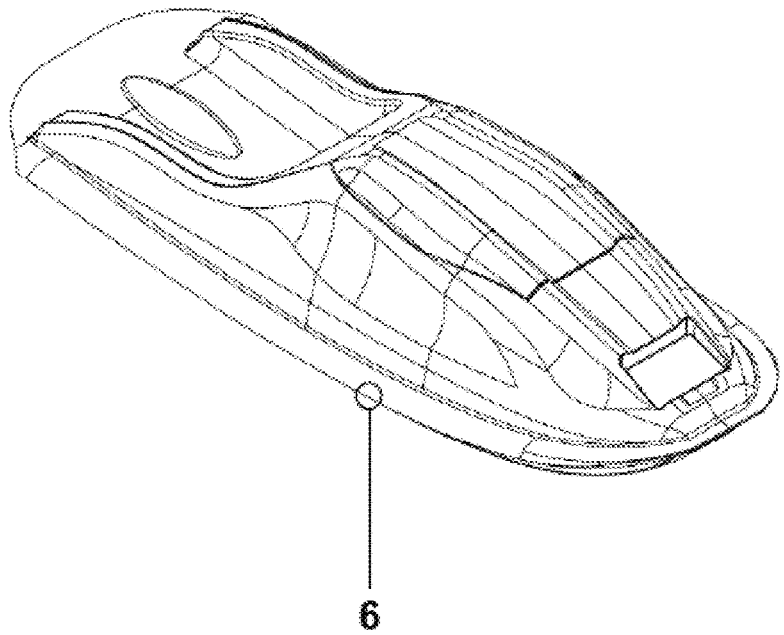
FIG. 13 is a perspective view of the assembled hull, top deck, and hood manufactured by the method of thermoform manufacturing according to an example embodiment.

Referring again to FIGS. 1 through 4 in the example embodiment, the illustrated bottom hull mold and top deck mold include a fourth feature 6A used to form bond rails 6 for both the top deck and hull/bottom deck on the fabricated watercraft (e.g., see FIG. 13). The bond rails 6 provide a means of mounting or bonding the thermoform-fabricated top deck to the thermoform-fabricated bottom hull/deck. In an example embodiment, the bond rails 6 are produced with a unique curvature downward, built into the hull (not an aftermarket add on) and providing the rider with additional handling performance. In particular, the downward curvature of the bond rails 6 act as a fin when the rider leans into a turn. The enlarged curved bond rails 6 prevent the watercraft from submerging on landings and washing the rider out of the foot tray 3. Because of the precision manufacturing enabled by the thermoforming process described herein, the top deck and bottom hull can be fabricated with tight tolerances, allowing for a sealable joint between the top and bottom deck. The bond rail 6 in the nose/bow of the watercraft is configured to be flat and short. This configuration allows for easy entry of the watercraft into the water, when entering the water bow first. A longer bond rail in the nose/bow of the watercraft would increase the shock/force when entering the water.

FIG. 5 is a top view of a personal watercraft thermoforming hood and covering component family mold. FIG. 6 is a perspective view of a personal watercraft thermoforming hood and covering component family mold. As shown in FIGS. 5 and 6, molds can be used to fabricate a watercraft hood and covering component using the thermoforming process described above. In an example embodiment, the illustrated mold includes a first feature 7A used to form a hood/engine covering 7 for the fabricated watercraft (e.g., see FIGS. 11 and 12). The hood/engine covering 7 is produced by a recessed feature 7A in the mold. On the exterior side of the fabricated hood/engine covering 7, the hood/engine covering 7 is a rounded, generally rectangular component. The hood/engine covering 7 provides a hood, which can be placed on top of the engine bay opening 5 and mounted to the top deck. The hood/engine covering 7 prevents water from entering the watercraft engine bay.

Referring still to FIGS. 5 and 6 in the example embodiment, the illustrated thermoforming hood and covering component family mold includes a second feature 8A used to form a ride/pump plate covering 8 (e.g., see FIGS. 11 and 12). The ride/pump plate covering 8 is produced by generally rectangular, raised feature 8A in the watercraft mold. On the exterior side of the fabricated ride/pump plate covering 8, the ride/pump plate covering 8 is a generally rectangular component. The ride/pump plate covering 8 is produced to cover and protect the jet pump on the bottom deck/hull of the watercraft.

As shown in FIGS. 1 through 6, thermoforming molds can be provided to fabricate watercraft components using the thermoforming process described above. The thermoforming process of the example embodiments provides a fabrication method that produces durable and precise components, is cost effective, and provides a green alternative to conventional fiberglass manufacturing of personal watercraft (PWC) hulls and components. The thermoforming process of the example embodiments provides a green alternative; because, the process uses zero VOC (volatile organic compound) emitting materials, produces recyclable components, uses less manufacturing steps, takes less time, and produces less waste.

FIG. 7 is a top view of the result of thermoform manufacturing a bottom hull according to an example embodiment. FIG. 8 is a perspective view of the result of thermoform manufacturing a bottom hull according to an example embodiment. As described above, the thermoformed bottom hull can be fabricated using the mold described above with the integrated features assimilated from the mold. By virtue of the thermoforming process, the fabricated bottom hull is durable and precisely manufactured.

FIG. 9 is a top view of the result of thermoform manufacturing a top deck according to an example embodiment. FIG. 10 is a perspective view of the result of thermoform manufacturing a top deck according to an example embodiment. As described above, the thermoformed top deck can be fabricated using the mold described above with the integrated features assimilated from the mold.

FIG. 11 is a top view of the result of thermoform manufacturing a hood and covering components according to an example embodiment. FIG. 12 is a perspective view of the result of thermoform manufacturing a hood and covering components according to an example embodiment. As described above, the thermoformed hood and covering components can be fabricated using the mold described above with the integrated features assimilated from the mold.

Figure 14:
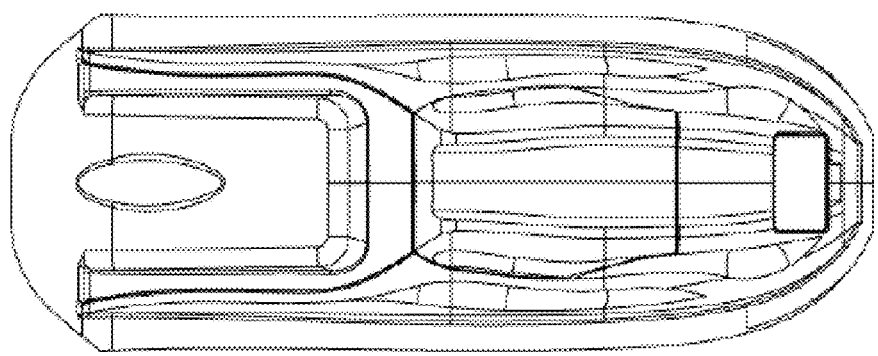
FIG. 14 is a top view of the assembled hull, top deck, and hood manufactured by the method of thermoform manufacturing according to an example embodiment.

FIG. 13 is a perspective view of the assembled hull, top deck, and hood manufactured by the method of thermoform manufacturing according to an example embodiment. FIG. 14 is a top view of the assembled hull, top deck, and hood manufactured by the method of thermoform manufacturing according to an example embodiment. FIG. 15 is a side view of the assembled hull, top deck, and hood manufactured by the method of thermoform manufacturing according to an example embodiment. FIG. 16 is a bottom view of the assembled hull, top deck, and hood manufactured by the method of thermoform manufacturing according to an example embodiment.

Once each of the watercraft components is fabricated using the thermoforming process described above, the components can be assembled into a completed watercraft. The top deck can be coupled to the bottom hull at the bond rails 6 as described above. A conventional epoxy, acrylic, bonding agent, rivets, screws, or other attachment mechanisms can be used to secure the top deck and bottom hull components together. The hood and covering component and the ride/pump plate covering can be similarly attached. As a result, a complete watercraft assembly can be fabricated using the thermoforming process as described herein.

Referring now to FIG. 17, a flow chart illustrates an example embodiment of a method 900 as described herein. The method 900 of an example embodiment includes: producing a mold for a component of a personal watercraft, the mold including features for assimilation into the component (method block 902); inserting thermoplastic material into a heater (method block 904); draping the heated thermoplastic material over the mold (method block 906); drawing the heated thermoplastic material into or over the mold using a vacuum, the heated thermoplastic material assimilating the features of the mold to produce the component (method block 908); allowing the component to cool (method block 910); extracting the component from the mold (method block 912); and trimming excess material from the component (method block 914).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method of forming a jet-pump powered personal watercraft, the method comprising:
    producing a top deck mold for a first component of the personal watercraft, the top deck mold including a plurality of features for assimilation into the first component, the plurality of features of the top deck mold including a foot tray feature, a bulkhead/firewall feature, a gunwales feature, an engine bay opening feature, and a first bond rail feature;
    inserting a first thermoplastic material into a heater;
    draping the heated first thermoplastic material over the top deck mold;
    drawing the heated first thermoplastic material into or over the top deck mold using a vacuum, the heated first thermoplastic material assimilating the features of the top deck mold to produce the first component;
    allowing the first component to cool;
    extracting the first component from the top deck mold;
    producing a bottom hull mold for a second component of the personal watercraft, the bottom hull mold including a plurality of features for assimilation into the second component, the plurality of features of the bottom hull mold including a mid-rocker feature, a convex groove feature running longitudinally along the bottom hull mold and parallel to a center line of the bottom hull mold, a pump cavity feature, and a second bond rail feature having a shape complementary of the first bond rail;
    inserting a second thermoplastic material into the heater;
    draping the heated second thermoplastic material over the bottom hull mold;
    drawing the heated second thermoplastic material into or over the bottom hull mold using a vacuum to produce the second component;
    allowing the second component to cool;
    extracting the second component from the bottom hull mold;
    trimming excess material from the first component;
    trimming excess material from the second component; and
    coupling the first bond rail of the first component to the second bond rail of the second component to form the personal watercraft.

2. The method of claim 1 wherein at least one of the first thermoplastic material and the second thermoplastic material does not contain volatile organic compound (VOC) emitting materials.

3. The method of claim 1, further comprising producing a hood mold comprising a shape configured to engage with the engine hay opening feature of the first component.

4. The method of claim 3, further comprising producing a plate covering mold comprising a shape configured to engage with the pump cavity feature of the second component.

5. The method of claim 4, wherein the plate covering mold and the hood mold comprise a family mold.

6. The method of claim 3, further comprising:
heating a third thermoplastic material;
draping the heated third thermoplastic material over the hood mold;
drawing the heated third thermoplastic material into or over the hood mold using a vacuum to form a hood;
allowing the hood to cool;
extracting the hood from the hood mold;
trimming excess material from the hood; and
coupling the hood to the first component proximate the engine hay opening.

7. The method of claim 4, further comprising:
heating a fourth thermoplastic material;
draping the heated fourth thermoplastic material over the plate covering mold;
drawing the heated fourth thermoplastic material into or over the plate covering mold using a vacuum to form a plate covering;
allowing the plate covering to cool;
extracting the plate covering from the plate covering mold;
trimming excess material from the plate covering; and
coupling the plate covering to the second component proximate the pump cavity.

8. The method of claim 1, wherein the plurality of features of the bottom hull mold include a plurality of convex groove features, each convex groove feature running longitudinally along the bottom hull mold and parallel to the center line of the bottom hull mold.

* * * * *